United States Patent
Haas

[15] 3,683,028
[45] Aug. 8, 1972

[54] PROCESS FOR THE MANUFACTURE OF TRISHYDROXYMETHYLPHOSPHINE OXIDE

[72] Inventor: Hans Haas, 249 Industriestrasse, Knapsack, near Cologne, Germany

[22] Filed: May 8, 1970

[21] Appl. No.: 35,889

[30] Foreign Application Priority Data

June 16, 1969 Germany..........P 19 30 521.6

[52] U.S. Cl............................................260/606.5 P
[51] Int. Cl.................................................C07f 9/02
[58] Field of Search...............................260/606.5 P

[56] References Cited

UNITED STATES PATENTS 3,100,799  8/1963  Rauhut................260/606.5 P

Primary Examiner—Tobias E. Levow
Assistant Examiner—Werten F. W. Bellamy
Attorney—Connolly and Hutz

[57] ABSTRACT

Production of trishydroxymethylphosphine oxide from trishydroxymethylphosphine in the presence of water. The oxide is produced by reacting 1 mol of the phosphine with at least 1 mol water in contact with between 0.1 and 10 weight percent of a formaldehyde catalyst, based on the phosphine, at temperatures of between 60° and 200° C.

7 Claims, No Drawings

PROCESS FOR THE MANUFACTURE OF TRISHYDROXYMETHYLPHOSPHINE OXIDE

The present invention relates to a process for the manufacture of trishydroxymethylphosphine oxide from trishydroxymethylphosphine in the presence of water.

It has already been reported in German Specification 1,040,549 that trishydroxymethylphosphine can be oxidized to its oxide by means of oxygen or a substance yielding oxygen, such as hydrogen peroxide, manganese dioxide, potassium permanganate, mercury oxide, or potassium bichromate. As taught by A. Hofmann (Journ. Am. Chem. Soc., 1921, page 1,687, and 1930, page 2,996), the oxide can also be produced by subjecting tetrahydroxymethylphosphonium chloride to treatment with a hot alkali metal hydroxide or carbonate.

The present invention now unexpectedly provides a very simple process for the manufacture of trishydroxymethylphosphine oxide from trishydroxymethylphosphine in the presence of water, which comprises reacting 1 mol of the phosphine with at least one mol water in contact with between 0.1 and 10 weight percent of a formaldehyde catalyst, based on the phosphine, at temperatures of between 60° and 200°.

A preferred feature of the present invention comprises using between 1 and 20 mols water, per mol phosphine, and between 1 and 5 weight percent formaldehyde catalyst, and carrying out the reaction at temperatures of between 100° and 150°C. At these temperatures, the reaction should advantageously be carried out in a pressure-resistant vessel.

The formaldehyde may be used either in the form of an aqueous solution or in the form of paraformaldehyde.

The following reaction scheme illustrates the process of the present invention.

$$P(CH_2OH)_3 + CH_2O + H_2O \rightarrow [P^+(CH_2OH)_4]OH^-$$

$$[P^+(CH_2OH)_4]OH^- \rightarrow O = P(CH_2OH)_3 + H_2 + CH_2O$$

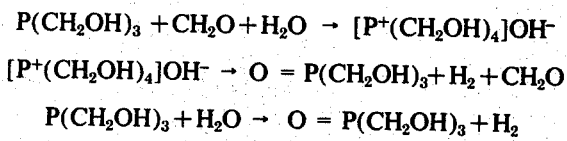

$$P(CH_2OH)_3 + H_2O \rightarrow O = P(CH_2OH)_3 + H_2$$

An insignificant portion of the formaldehyde catalyst may undergo reduction to methanol, as can be demonstrated by magnetic nuclear resonance spectroscopy.

The process of the present invention produces an unexpected result inasmuch as the phosphines could not be found heretofore to react with water in the manner illustrated by the above reaction scheme. It is the unexpected catalystic effect just of formaldehyde which enables the above reaction to proceed.

As compared with earlier methods used for the production of trishydroxymethylphosphine oxide, the process of the present invention offers a series of advantages. These inter alia include shorter reaction periods by the use of higher reaction temperatures. Still further, it is possible to carry out the reaction substantially in the absence of solvents. The small quantities of water are consumed during the reaction. This enables the distillation period necessary to eliminate the solvent to be considerably shortened or even dispensed with. A further advantage over earlier oxidation methods resides in the fact that it is unnecessary for the reaction heat to be dissipated by cooling. The reaction itself being slightly exothermal, the reaction heat evolved should advantageously be used for maintaining a higher reaction temperature.

EXAMPLE 1

One-hundred grams trishydroxymethylphosphine were dissolved in 100 cc water and 10 grams of an aqueous, 37 weight percent solution of formaldehyde were added thereto. The resulting mixture was refluxed-heated over a period of 6 hours. Following this, the formaldehyde and water were distilled off under reduced pressure (20 mm Hg) at about 80° C. One hundred and twelve grams water-white, oily trishydroxymethylphosphine oxide were obtained. It was free from unreacted phosphine as could be demonstrated by nuclear resonance spectroscopy. The yield was 99 percent of the theoretical, based on the phosphine used.

EXAMPLE 2

Two-hundred grams trishydroxymethylphosphine together with 50 cc water and 10 grams of an aqueous, 37 weight percent solution of formaldehyde were introduced into a 1 liter autoclave. After scavenging with nitrogen, the whole was heated to 130° C. After 3 hours, the pressure prevailing in the autoclave was found to have increased to 46 atmospheres, due to the evolution of $H_2$. The issuing-gas was analyzed and found to contain 87 percent by volume hydrogen. The formaldehyde and water were distilled off under reduced pressure (about 20 mm Hg). 221 grams colorless spectroscopically pure trishydroxymethylphosphine oxide were obtained. The yield was 98 percent of the theoretical, based on the phosphine used.

The same result was obtained when paraformaldehyde was substituted for the formaldehyde solution.

EXAMPLE 3

One-hundred and fifty grams trishydroxymethylphosphine were mixed in a 1 liter stirrer autoclave with 50 cc water and 50 cc of an aqueous, 37 weight percent solution of formaldehyde. After scavenging with nitrogen, the whole was heated for 40 minutes to 140° C. The pressure increased to 29 atmospheres. The reaction gas was analyzed and found to contain 93 percent by volume hydrogen. The formaldehyde and residual water were distilled off at 20 mm Hg and 169 grams water-white trishydroxymethylphosphine oxide were obtained. The compound was from unreacted phosphine. The yield was 99 – 100 percent of the theoretical, based on the phosphine used.

EXAMPLE 4

One-hundred and fifty grams trishydroxymethylphosphine and 40 cc of an aqueous, 37 weight percent solution of formaldehyde were heated for 3 hours to 140° C in a 1 liter autoclave, previously scavenged with nitrogen. The pressure increased to 26 atmospheres. Nine-four percent by volume of the reaction gas was hydrogen. The resulting reaction product contained a minor proportion of residual water, catalyst (formaldehyde) and a minor proportion of methanol. After distillation for a short while at 20 mm Hg, there was obtained 169 grams colorless trishydroxymethylphosphine oxide. The nuclear resonance spectrum showed that it was free from unreacted phosphine. The yield was 99 to 100 percent of the theoretical, based on the phosphine used.

I claim:

1. A process for the manufacture of $O = P(CH_2OH)_3$ in the presence of water, which comprises oxidizing 1 mol of $P(CH_2OH)_3$ with at least 1 mol water in contact with between 0.1 and 10 weight percent of a catalyst consisting of formaldehyde or paraformaldehyde based on the phosphine, at temperatures of between 60 and 200° C, and recovering the formaldehyde and isolating the $O = P(CH_2OH)_3$ product.

2. The process as claimed in claim 1, wherein between 1 and 20 mols water is used per mol phosphine.

3. The process as claimed in claim 1, wherein the formaldehyde catalyst is used in a proportion of between 1 and 5 weight percent.

4. The process as claimed in claim 1, wherein the reaction is carried out at temperatures of between 100° and 150° C.

5. The process as claimed in claim 4, wherein the reaction is carried out in a pressure-resistant vessel.

6. The process as claimed in claim 1, wherein the formaldehyde is used in the form of an aqueous solution.

7. The process as claimed in claim 1, wherein the formaldehyde is used in the form of paraformaldehyde.

* * * * *